US008051283B2

(12) United States Patent
Lee et al.

(10) Patent No.: US 8,051,283 B2
(45) Date of Patent: Nov. 1, 2011

(54) MESSAGE SECURITY PROCESSING SYSTEM AND METHOD FOR WEB SERVICES

(75) Inventors: Jae Seung Lee, Seoul (KR); Ki Young Moon, Daejeon (KR); Jung Chan Na, Daejeon (KR); Sung Won Sohn, Daejeon (KR); Chee Hang Park, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1391 days.

(21) Appl. No.: 10/937,040

(22) Filed: Sep. 8, 2004

(65) Prior Publication Data
US 2005/0144457 A1 Jun. 30, 2005

(30) Foreign Application Priority Data
Dec. 26, 2003 (KR) .................. 10-2003-0097162

(51) Int. Cl.
*H04L 29/06* (2006.01)
*H04L 9/32* (2006.01)
(52) U.S. Cl. ......... 713/150; 713/121; 713/152; 713/176
(58) Field of Classification Search .................. None
See application file for complete search history.

(56) References Cited

U.S. PATENT DOCUMENTS
5,949,877 A 9/1999 Traw et al.
2002/0143855 A1* 10/2002 Traversat et al. ............. 709/202
2004/0010570 A1* 1/2004 Kaler et al. .................. 709/220
2004/0230943 A1* 11/2004 Pourheidari et al. .......... 717/101

FOREIGN PATENT DOCUMENTS
KR 000059445 10/2000
KR 1020020003835 1/2002

OTHER PUBLICATIONS

SOAP Version 1.2 Part 2: Adjuncts, W3C Working Draft Jun. 26, 2002, pp. 1-49.*

* cited by examiner

*Primary Examiner* — Benjamin Lanier
(74) *Attorney, Agent, or Firm* — Blakely, Sokoloff, Taylor & Zafman

(57) ABSTRACT

A message security processing system and method for Web services are provided. In the message security processing system in which messages are exchanged between a client and a server with a SOAP-RPC format, each of the client and the server includes: a security interface allowing information related to digital signature, encryption, and timestamp insertion to be set in a security context object for an application program to meet security requirements of the client or the server; a security handler receiving the security context object from the security interface, and performing security processing of a request message by calling security objects stored in a request queue of the security context object one by one in order or performing security processing of a response message by calling security objects stored in a response queue of the security context object one by one in order; and an XML security unit supporting an XML security functions by called by the security handler.

11 Claims, 7 Drawing Sheets

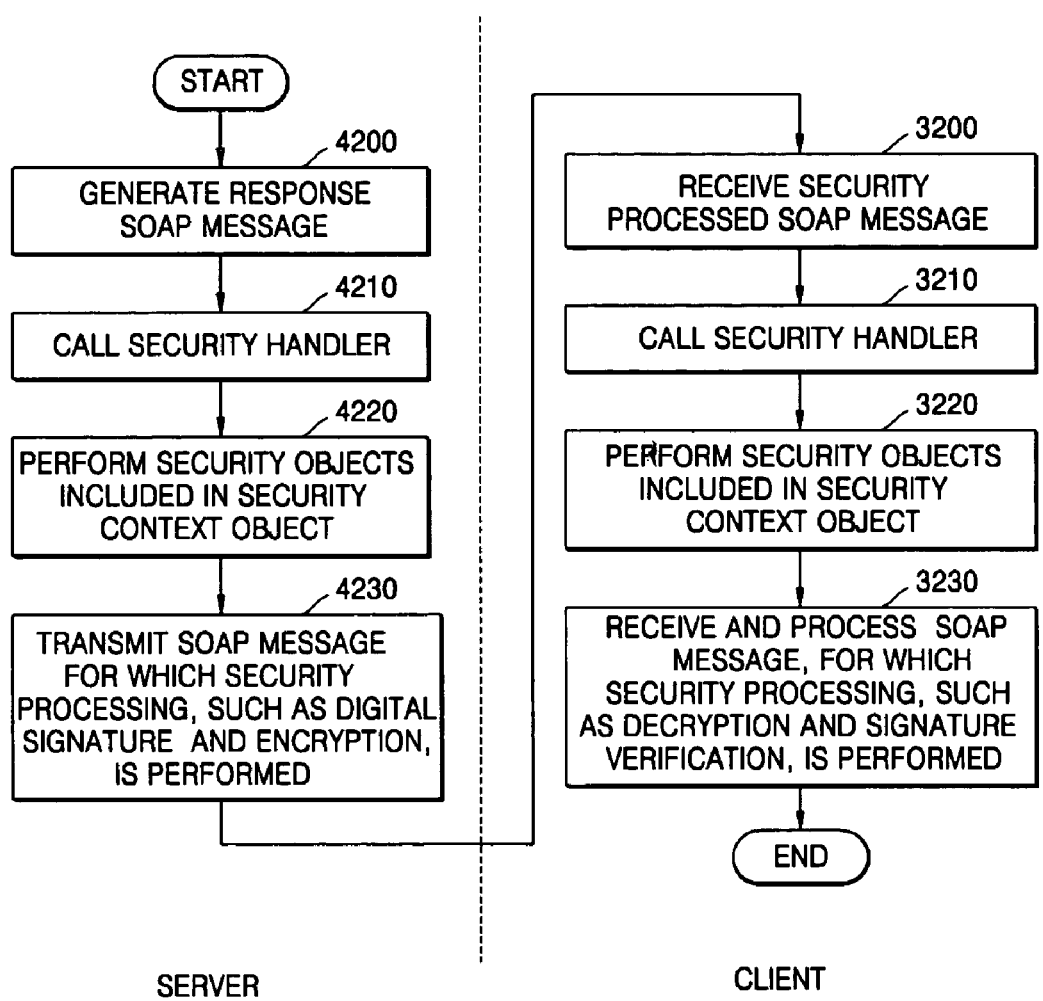

MESSAGE SECURITY PROCESSING SYSTEM AND METHOD FOR WEB SERVICES

This application claims the priority of Korean Patent Application No. 2003-97162, filed on Dec. 26, 2003, in the Korean Intellectual Property Office, the disclosure of which is incorporated herein in its entirety by reference.

BACKGROUND OF THE INVENTION

1. Field of the Invention

The present invention relates to an information security technology, and more particularly, to a message security processing system and method for Web services.

2. Description of the Related Art

Web services Technology is a widely used process for linking a client and a server using web standard technologies such as the extensible markup language (XML), the hypertext transfer protocol (HTTP), the simple object access protocol (SOAP), the Web service description language (WSDL), the universal description discovery and integration protocol (UDDI).

In the Web services, the SOAP is used for exchanging messages. The SOAP is a protocol based on the XML supporting remote procedure call (RPC) and messaging in all network protocols, and more particularly, in the HTTP. Since the SOAP is a protocol based on the XML instead using a binary format, flexibility between platforms, programming languages, and component models is excellent.

Since Web services and the SOAP are widely applied to high security application services such as e-commercial transactions, an information security technology for the Web services is very important. To support a message level security for the Web services, the Organization for the Advancement of Structured Information Standards (OASIS) has been standardizing Web services security (WS-Security).

In a SOAP message security standard, standards for authentication, integrity, confidentiality, and non-repudiation of SOAP messages and a standard for exchanging a security token are defined. To support the authentication, integrity, and non-repudiation of SOAP messages, XML Signatures developed by the world wide web consortium (W3C) are expanded and applied to the SOAP message security standard, and to support the confidentiality, XML Encryption developed by the W3C is expanded and applied to the SOAP message security standard, and to exchange information such as a public key, various formats of security tokens are defined. To prevent a replay attack, a function related to a timestamp is also added to the SOAP message security standard.

In the SOAP message security standard, a digital signature for a message to be protected is generated using an XML Signature method and stored in an XML element called a security header included in a SOAP header, and a cipher text for a message for which confidentiality is required is generated in the form of XML using an XML Encryption method and stored in the security header element or a SOAP body. Also, public key information to verify the digital signature is stored in a security token element in the security header and transmitted to a destination system. Since a timestamp for the generated SOAP message also can be stored in the SOAP header, a replay attack can be detected using the timestamp in an application.

A method of transmitting messages using the SOAP is divided into a SOAP RPC method and a SOAP messaging method. In the SOAP messaging method, a SOAP message, which an application program intends to directly transmit, is built and transmitted by the application program. On the other hand, in the SOAP RPC method, if an application program calls a function in a remote server as the application program calls a function in a local server without directly generating a SOAP message, a SOAP engine transforms the function call into the SOAP message and transmits the message to the remote server. The SOAP RPC method is very convenient since the application program does not have to directly transform a parameter to be transmitted into a SOAP message. Here, to protect a SOAP message to be transmitted, the application program must access the SOAP message and perform a digital signature process and an encryption process on the SOAP message. However, since the application program cannot directly access the SOAP message in the SOAP RPC method, it is difficult to apply a security module to the SOAP RPC method.

Also, to protect a SOAP message, information protection processes, such as digital signature, encryption, and timestamp insertion, must be combined with various formats and processed according to various options in response to needs of an application program, and a general and simple security processing method must be provided.

However, in conventional SOAP message security standards, only a syntax in which information related to security is added to a header of a SOAP message and a processing of the information are clearly stated, and a solution of problems described above is not stated.

SUMMARY OF THE INVENTION

The present invention provides a security processing system and method for providing authentication, integrity, confidentiality, and non-repudiation of messages exchanged in Web services to meet the needs of an application program when Web service message security technologies are applied to a Web service environment.

The present invention also provides a security processing system and method for allowing a SOAP message security technology to be simply applied to a SOAP RPC method and allowing a similar interface to be used in a SOAP messaging method.

According to an aspect of the present invention, there is provided a message security processing system for Web services in which messages are exchanged between a client and a server with a SOAP-RPC format, each of the client and the server comprising: a security interface allowing information related to digital signature, encryption, and timestamp insertion to be set in a security context object for an application program to meet security requirements of the client or the server; a security handler receiving the security context object from the security interface, and performing security processing of a request message by calling security objects stored in a request queue of the security context object one by one in order or performing security processing of a response message by calling security objects stored in a response queue of the security context object one by one in order; and an XML security unit supporting an XML security functions by called by the security handler.

According to another aspect of the present invention, there is provided a message security processing system for Web services in which messages are exchanged between a client and a server with a SOAP-messaging format, each of the client and the server comprising: a security interface allowing information related to digital signature, encryption, and timestamp insertion to be set in a security context object for an application program to meet security requirements of the client or the server; a security handler directly receiving a SOAP message and the security context object from the application program, performing security processing of a request message by calling security objects stored in a request queue of the security context object one by one in order or performing security processing of a response message by calling security objects stored in a response queue of the security context object one by one in order, and transmitting the security processing result to the application program; and an XML security unit supporting an XML security functions by called by the security handler.

According to another aspect of the present invention, there is provided a security processing method for Web service request messages to be exchanged between a client and a server with a SOAP-RPC format, the method comprising: (a) a Web service client setting a security context object to information related to digital signature, encryption, and timestamp insertion to meet security requirements for a request message to be transmitted and a response message to be received using an application program; (b) a security handler included in the client performing security processing of the request message by calling security objects stored in a request queue of the security context object one by one in order; (c) a SOAP client engine transmitting the security processing result obtained in step (b) to a SOAP server engine as a SOAP message; (d) a Web service server initialized by the SOAP server engine and setting the security context object to security requirements for the request message received from the client and the response message to be returned to the client; and (e) a security handler included in the server performing security processing of the received SOAP message by calling security objects stored in the request queue of the security context object set in step (d) one by one in order.

According to another aspect of the present invention, there is provided a security processing method for Web service response messages to be exchanged between a client and a server with a SOAP-RPC format, the method comprising: (a) a Web service server transmitting a SOAP message to a security handler included in the server via a SOAP server engine; (b) the security handler performing security processing of the SOAP message by calling security objects stored in a response queue of a security context object one by one in order; (c) a SOAP server engine transmitting the security processing result obtained in step (b) to a SOAP client engine as a SOAP message; (d) the SOAP client engine calling a security handler included in the client and transmitting the received SOAP message to the security handler included in the client; and (e) the security handler included in the client performing security processing of the SOAP message by calling security objects stored in the response queue of the security context object one by one in order.

According to another aspect of the present invention, there is provided a security processing method for Web service request messages to be exchanged between a client and a server with a SOAP-messaging format, the method comprising: (a) a Web service client setting a security context object to information related to digital signature, encryption, and timestamp insertion to meet security requirements for a request message to be transmitted and a response message to be received using an application program; (b) the Web service client transmitting the security context object generated in step (a) and a SOAP message generated for transmitting to a server as parameters to a security handler, which is implemented as an application, included in the client; (c) the security handler directly called by the Web service client and performing security processing of the SOAP message by calling security objects stored in a request queue of the security context object one by one in order; (d) a SOAP client engine receiving the security processing result obtained in step (c) from the Web service client and transmitting the security processing result to a SOAP server engine as a SOAP message; (e) a Web service server initialized by the SOAP server engine and setting the security context object to security requirements for the request message received from the client and the response message to be returned to the client; (f) the Web service server transmitting the security context object and the SOAP message received in step (d) to a security handler, which is implemented as an application, included in the server; and (g) the security handler included in the server directly called by the Web service server and performing security processing of the received SOAP message by calling security objects stored in the request queue of the security context object set in step (e) one by one in order.

According to another aspect of the present invention, there is provided a security processing method for Web service response messages to be exchanged between a client and a server with a SOAP-messaging format, the method comprising: (a) a Web service server generating a SOAP response message in response to a received SOAP message and transmitting the SOAP response message to a security handler included in the server; (b) the security handler directly called by the Web service server and performing security processing of the SOAP response message by calling security objects stored in a response queue of a security context object one by one in order; (c) a SOAP server engine receiving the security processing result obtained in step (b) from the Web service server and transmitting the security processing result as a SOAP message to a SOAP client engine; (d) a Web service client receiving the SOAP message from the SOAP client engine and transmitting the received SOAP message to a security handler included in the client by directly calling the security handler included in the client; and (e) the security handler included in the client performing security processing of the SOAP message by calling security objects stored in the response queue of the security context object one by one in order.

BRIEF DESCRIPTION OF THE DRAWINGS

The above and other features and advantages of the present invention will become more apparent by describing in detail exemplary embodiments thereof with reference to the attached drawings in which:

FIG. 7 is a flowchart illustrating an operation of processing security of a response message in the security processing system of FIG. 3.

DESCRIPTION OF MAIN PARTS OF THE ACCOMPANYING DRAWINGS 100 and 300: a SOAP client engine
200 and 400: a SOAP server engine
120, 220, 320, and 420: a security handler
130, 230, 330, and 430: an XML security unit
140, 240, 340, and 440: a security interface

DETAILED DESCRIPTION OF THE INVENTION

Hereinafter, the present invention will now be described more fully with reference to the accompanying drawings, in which embodiments of the invention are shown.

Figure 1:
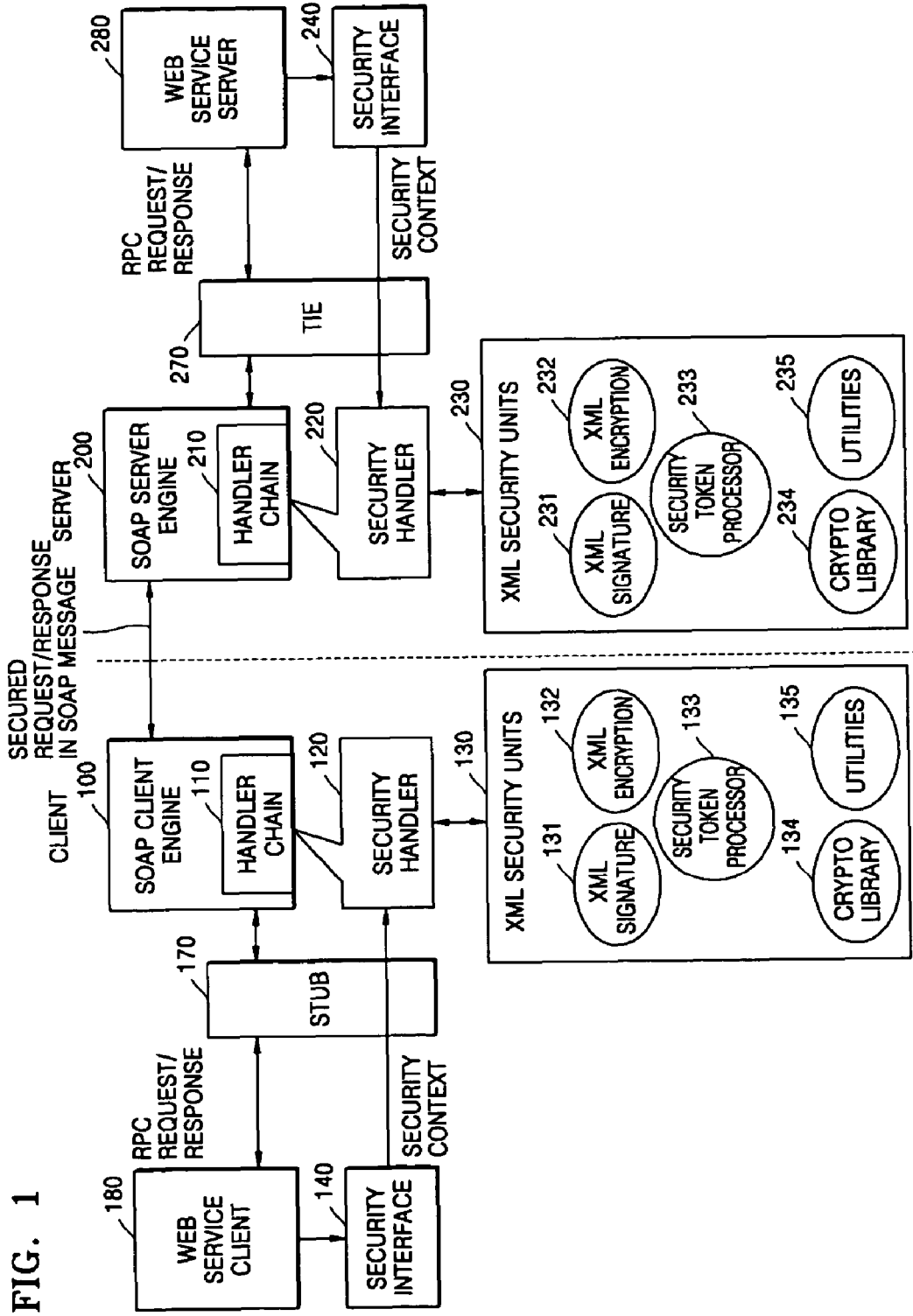
FIG. 1 is a block diagram of a security processing system in a SOAP-RPC environment according to an exemplary embodiment of the present invention.

FIG. 1 is a block diagram of a security processing system in a SOAP-RPC environment according to an exemplary embodiment of the present invention. Referring to FIG. 1, in a SOAP RPC environment, a SOAP client engine 100, a stub object 170, and a Web service client 180 are included in a client, and a SOAP server engine 200, a tie object 270, and a Web service server 280 are included in a server. The Web service client 180 and the Web service server 280 operate in a Web service environment and are application programs playing roles as a client and a server, respectively.

The stub object 170 includes a function having the same name as the Web service server 280 has. If the Web service client 180 calls the function included in the stub object 170 to use the function having the same name included in the Web service server 280, a request message is transformed into a SOAP message format by the stub object 170 and the SOAP client engine 100 and transmitted to the server. The SOAP message transmitted to the server is transformed into a function call message by the SOAP server engine 200 and the tie object 270 and transmitted to the Web service server 280 to call the function. A process of transmitting the result of the called function from the server to the client follows the reverse path of transmitting the SOAP message from the client to the server. The remote function calling method is called a remote procedure call (RPC).

Components added to apply message security to the SOAP RPC in FIG. 1 are security handlers 120 and 220, XML security units 130 and 230, and security interfaces 140 and 240.

The security handlers 120 and 220 are configured as a SOAP message handler and installed in handler chains 110 and 210 of the SOAP client/server engines 100 and 200, respectively. The SOAP message handler makes additional processing for a SOAP message, such as header addition, possible by allowing an application program to directly access the SOAP message in an RPC process when using the SOAP RPC. Therefore, if the security handlers 120 and 220 are installed as the SOAP message handler, the application program can access SOAP messages exchanged between the client and the server and perform SOAP message security, such as digital signatures and encryption, for the SOAP messages.

To apply message security to a SOAP RPC, the security handlers 120 and 220 must be installed in a SOAP runtime environment. A method of installing the security handlers 120 and 220 includes a method of designating handlers to be called and orders to be called in a configuration file and a method of allowing the application program to designate handlers to be called and orders to be called. Here, if the security handlers 120 and 220 are not designated to use, message security performed by the security handlers 120 and 220 is not performed.

When the SOAP message security is performed, security requirements from application programs are different from each other, and a plurality of options exist in the SOAP message security. Therefore, to meet security requirements from the application programs, information protection processing, such as digital signatures, encryption, and timestamp insertion, must be combined with various formats and processed according to various options.

To do this, in a conventional method, parameters related to digital signatures and encryption are directly set in message handler codes. And, in a conventional method, combining security functions such as whether the digital signature is applied to a message or the message is encrypted and whether the digital signature is performed after the encryption or the encryption is performed after the digital signature are directly set in message handler codes. However, since security requirements from application programs are different from each other, when the conventional method is used, separate security handler must be generated for each application program, and all security handlers must be installed in a SOAP engine. Accordingly, the conventional method is very inefficient. Also, when security parameters are set in the SOAP message handler, it is inconvenient to receive parameter set options from a user when executing a program.

To solve the problems described above, in an embodiment of the present invention, the security interfaces 140 and 240 allow an application program to set options for SOAP security. Using the security interfaces 140 and 240, the application program sets security token information, which part of the message is encrypted or signed, and which algorithm is used, required for security, such as digital signatures and encryption, to meet security requirements of the application program, designates a combining method of security functions such as whether the digital signature is applied to a message or the encryption is applied to the message and whether the digital signature is performed after the encryption or the encryption is performed after the digital signature, generates a security context object including the settings, and transmits the security context object to the security handlers 120 and 220, respectively. A configuration of the security context object will now be described with reference to FIG. 2.

Figure 2:
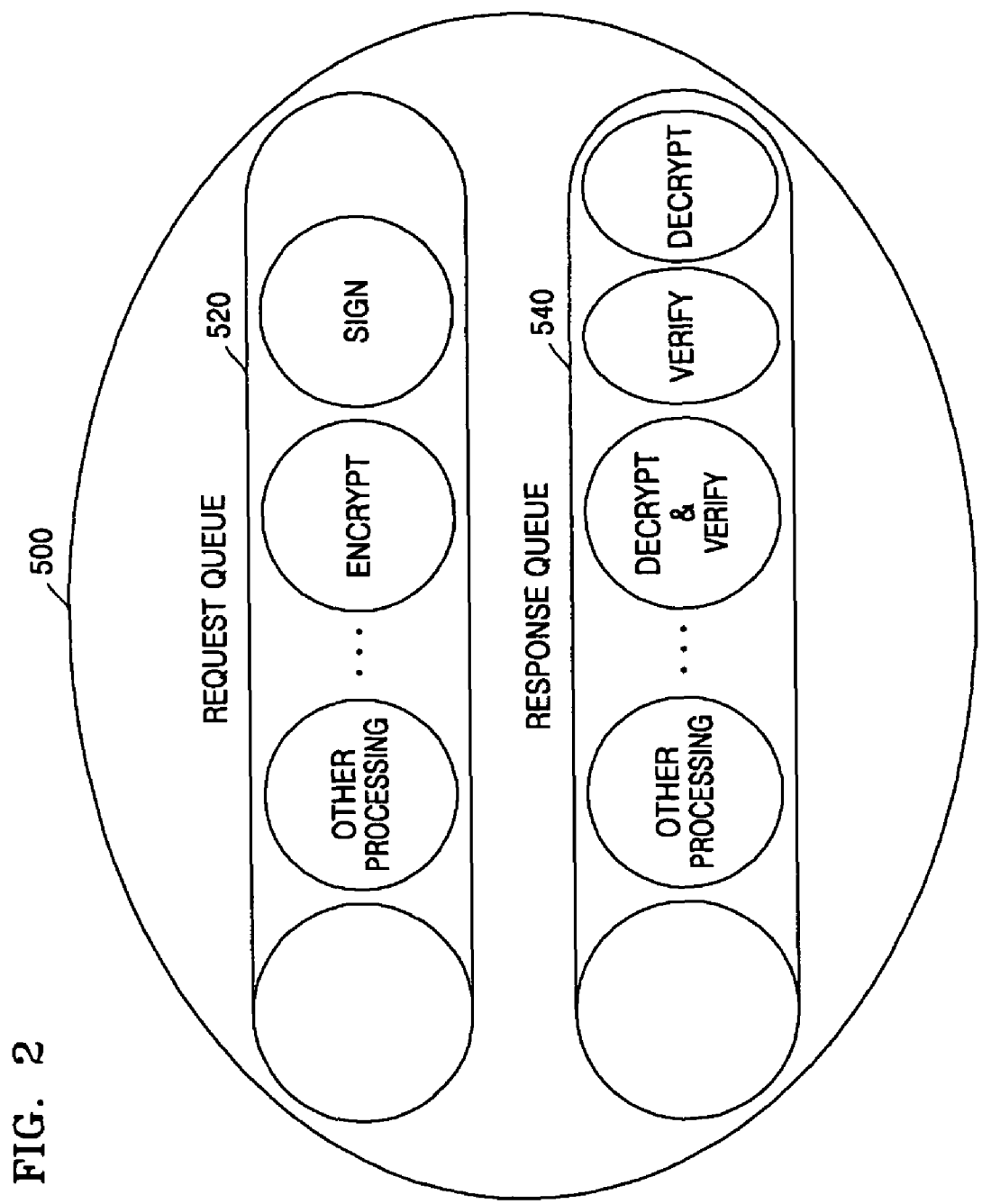
FIG. 2 illustrates a configuration of a security context object for transmitting security information according to an exemplary embodiment of the present invention.

FIG. 2 illustrates a configuration of a security context object 500 for transmitting security information according to an exemplary embodiment of the present invention.

Referring to FIG. 2, the security context object 500 includes two queues such as a request queue 520 and a response queue 540. In the request queue 520, unit security objects for security of a request message are inserted, and in the response queue 540, unit security objects for security of a response message are inserted, in order designated by an application program.

The unit security objects include a sign object performing XML Signature and inserting the signature into a SOAP Message header for SOAP message security, a verify object verifying the XML Signature, an encrypt object performing XML encryption of the SOAP message and inserting the encrypted message into the SOAP message header or into the SOAP message body, and a decrypt object decrypting the encrypted message. Also, the unit security objects can include an object inserting a timestamp, an object checking the timestamp, and an object performing additional processing of the SOAP message.

When the SOAP message security is used, if a plurality of signatures and encryptions are processed, order information of the signatures and encryptions is included in a message header to which the security is applied. Besides, a decrypt & verify object decrypting and verifying in an appropriate order by analyzing the order information can be included in the message header. Also, the application program by itself can make a security object required by the application program and insert the security object into a queue to be processed.

When security processing, such as digital signing and encrypting, is performed, setting of parameters, such as a security token for transferring public key information, uniform resource identifier (URI) information indicating location information of a message to be processed, and a usage algorithm, is required, and the parameters are included in relevant security objects and transmitted.

The security context object 500 is separately generated and used in the client and the server, and objects used for processing a request message and objects used for processing a response message are inserted in the request queue 520 and the response queue 540 in desired processing order, respectively.

The security handlers 120 and 220 receive the security context object 500, perform security processing by calling the security objects included in the request queue 520 one by one in order when the request message is processed, and perform security processing by calling the security objects included in the response queue 540 one by one in order when the response message is processed. For example, when the request message is signed and then encrypted, the application program inserts the sign object into the request queue 520 and then inserts the encrypt object into the request queue 520. The security handlers 120 and 220 receives the security context object 500, process the signature by calling a security function using, the sign object with set parameters and encrypts the message using the encrypt object.

All security objects implement the same interface. Therefore, the security handlers 120 and 220 can use a function of a relevant object with the same method when security processing is performed. That is, if the security handler 120 or 220 takes out the security objects included in the request queue 520 or the response queue 540 one by one in order and calls methods having the same names and parameters as the security objects have, security processing provided by the security objects is performed. In this case, every setting related to security is processed in application programs, and the security handlers 120 and 220 just perform by calling received objects one by one in order regardless of processing any requirements of the application programs. Accordingly, it is not necessary to make and install a separate security handler for every application program, and only one security handler can be commonly used for all application programs. Also, since all parameters related to the security can be set in the application programs, it is also easy to input options related to the security from a user.

A method of transmitting the security context object 500 to the security handler 120 or 220 is different according to SOAP implementation products. In general, when parameters are transmitted to the stub object 170 or the tie object 270, the security context object 500 is included in a SOAP message context and transmitted to the security handler 120 or 220.

In FIG. 1, the XML security units 130 and 230 are called by the security handlers 120 and 220 and provide functions required for processing the SOAP message security. The XML security units 130 and 230 include XML signature units 131 and 231, XML encryption units 132 and 232, security token processors 133 and 233, crypto libraries 134 and 234, and utilities 135 and 235, respectively.

Each of the XML signature units 131 and 231 is called and used when the sign object or the verify object included in the security context object 500 performs signing or verifying.

Each of the XML encryption units 132 and 232 is called and used when the encrypt object or the decrypt object performs XML encryption or XML decryption.

Each of the security token processors 133 and 233 processes the security token including the public key information required for the XML signature and encryption.

Each of the crypto libraries 134 and 234 provides algorithms required for the encryption, such as an digital signature algorithm and an encryption algorithm.

The utilities 135 and 235 provide functions executing utility programs required by other XML security units.

Figure 3:
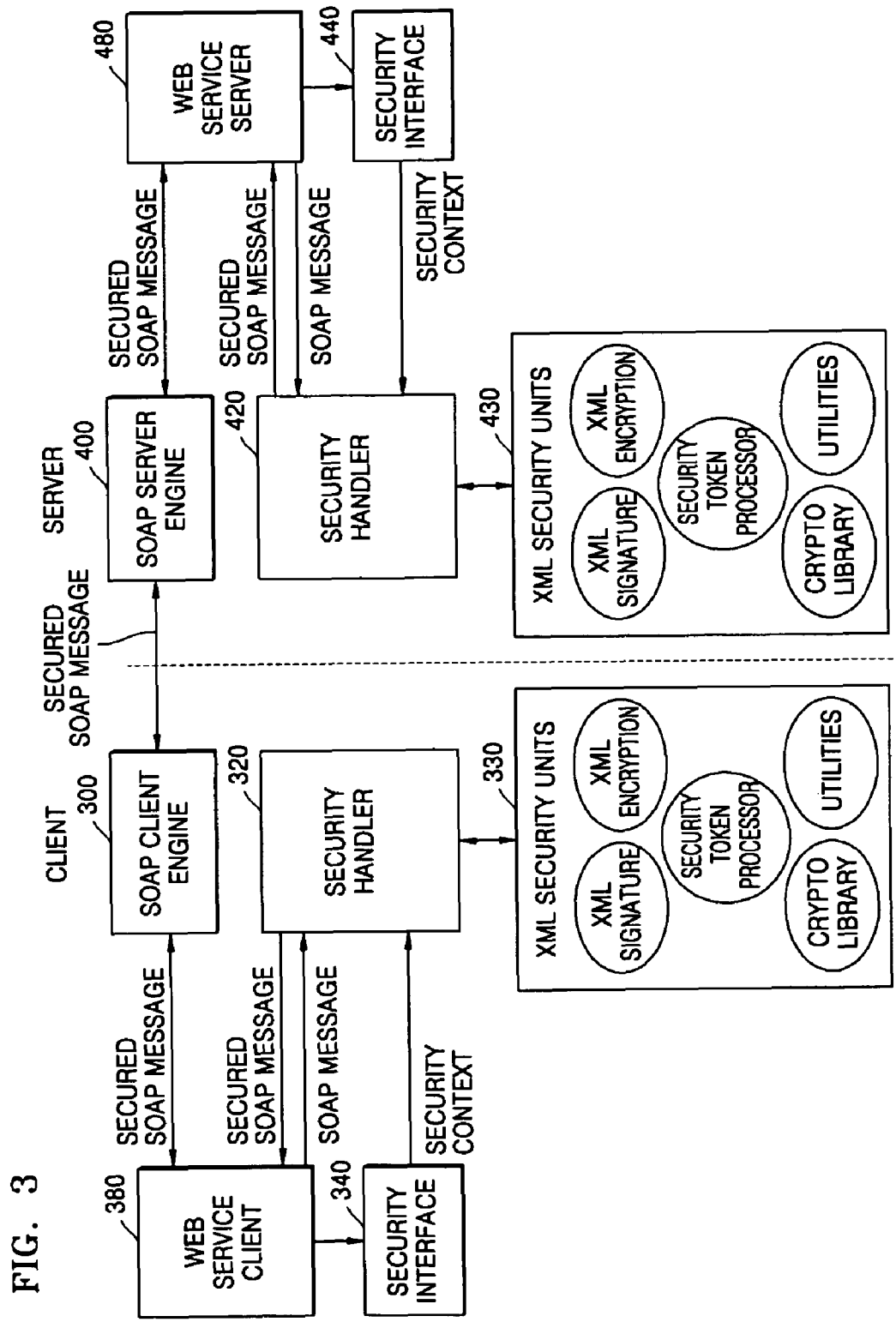
FIG. 3 is a block diagram of a security processing system in a SOAP messaging environment according to an exemplary embodiment of the present invention.

FIG. 3 is a block diagram of a security processing system in a SOAP messaging environment according to an exemplary embodiment of the present invention. Referring to FIG. 3, in a SOAP messaging environment, a SOAP client engine 300 and a Web service client 380 are included in a client, and a SOAP server engine 400 and a Web service server 480 are included in a server. The Web service client 380 and the Web service server 480 work in a Web service environment and are application programs playing roles as a client and a server, respectively.

In SOAP messaging, an application program transmits a message to be transmitted by directly generating a SOAP message and processes the message by directly receiving the SOAP message. Therefore, the stub object and the tie object existing in the SOAP RPC environment are not necessary. Also, since the application program can directly access the SOAP message, a mechanism, such as the SOAP message handler, does not have to be used, and the application program can directly process security of the SOAP message.

Components added to apply message security to the SOAP messaging in FIG. 3 are security handlers 320 and 420, XML security units 330 and 430, and security interfaces 340 and 440, and they have logically similar structures to SOAP RPC. However, though the security handlers 120 and 220 are installed in the SOAP engines 100 and 200 as the SOAP message handler in the SOAP RPC, the security handlers 320 and 420 are composed of a general application and directly called by the application program. The XML security units 330 and 430 and security interfaces 340 and 440 are the same as those in the SOAP RPC. Therefore, to avoid duplicated description, a detailed description of a duplicated portion is omitted.

The security handlers 320 and 420 receive a security context object 500 set by the application program from the security interfaces 340 and 440, respectively. The security context object 500 is composed with the same configuration as in the SOAP RPC (refer to FIG. 2). Each of the security handlers 320 and 420 directly receives a SOAP message to be transmitted from the application program, processes security of the SOAP message as the security processing is set in the security context object 500, and transmits the security processing result to the application program again. The application program transmits/receives the SOAP message in which the security is processed using the SOAP client/server engine 300 or 400.

As described above, even when the SOAP messaging is used, if security processing is performed in a similar pattern to a case of the SOAP RPC by using the security handlers 320 and 420, which can be used by directly called by the application program, an application programmer can use similar interfaces for both the SOAP RPC and the SOAP messaging. Therefore, application program development becomes easy, and setting related to security also becomes easy.

Figure 4:
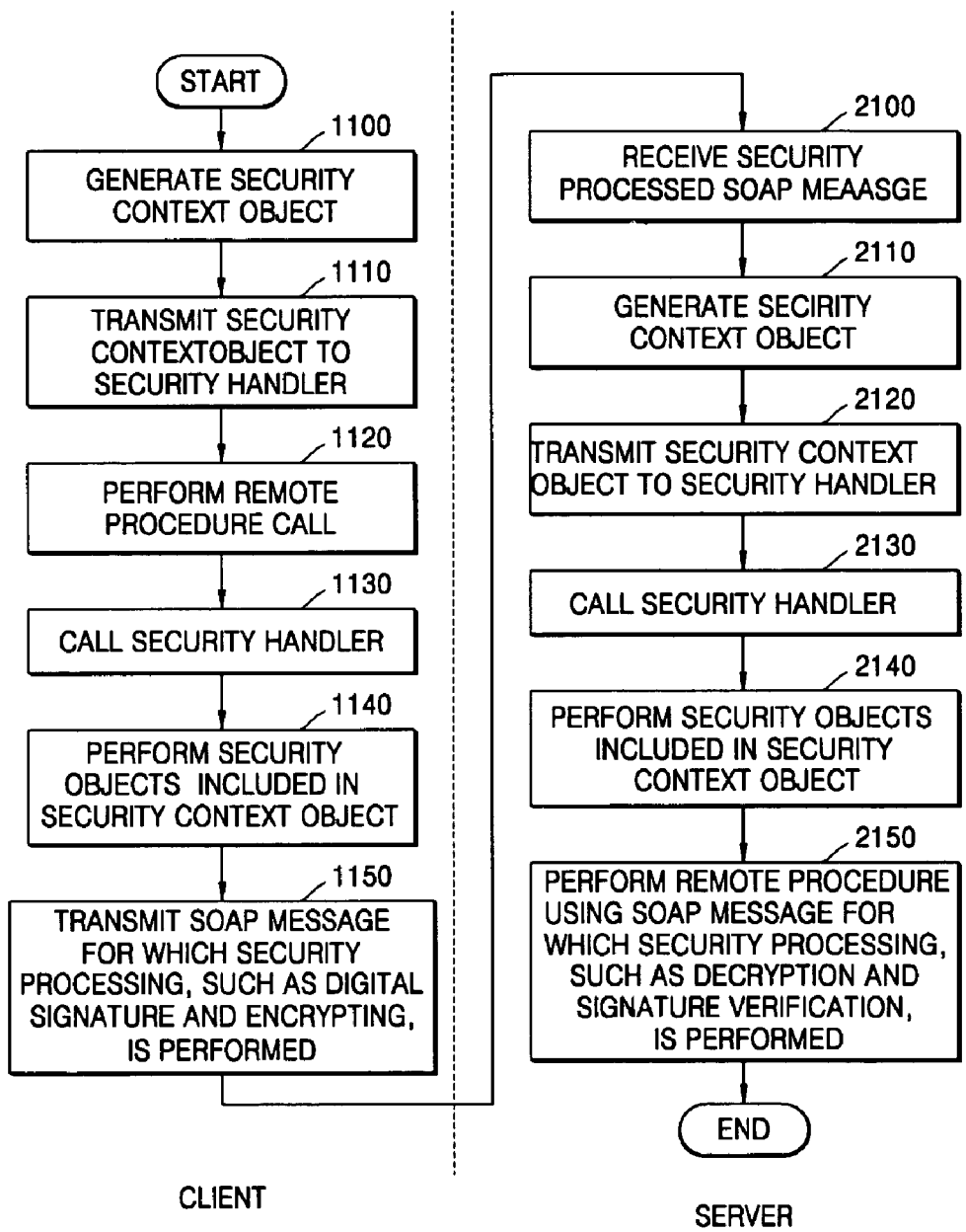
FIG. 4 is a flowchart illustrating an operation of processing security of a request message in the security processing system of FIG. 1.

FIG. 4 is a flowchart illustrating an operation of processing security of a request message in the security processing system of FIG. 1.

Referring to FIGS. 1 and 4, for security setting of a request to be transmitted and a response to be received, a Web service client 180 selects security objects via a security interface 140, inserts the respective selected objects into a request queue 520 and a response queue 540 of a security context object 500 in processing order, and generates the security context object 500 for security processing in a client in step 1100. Here, security parameters with respect to the security objects are set together.

The security context object 500 is transmitted to a security handler 120, which is a SOAP message handler, in step 1110. Though a method of transmitting the security context object 500 to the security handler 120 is different according to a SOAP implementation method, in common, if the security context object 500 is transmitted to a stub object 170, the security context object 500 is included in a SOAP message context and transmitted to the security handler 120.

After the security context object 500 is transmitted to the security handler 120, the Web service client 180 performs a remote process call (RPC) in step 1120. The RPC request message is transmitted to a SOAP client engine 100 via the stub object 170 and transformed into a SOAP message. In this case, since an application program is set so that the security handler 120 is called in response to the request message, the SOAP client engine 100 calls the security handler 120 and transmits the SOAP message to the security handler 120 in step 1130.

The security handler 120 calls unit security objects included in the request queue 520 of the security context object 500 received in step 1110 one by one and performs security processing (for example, signing and encrypting) of the received SOAP message in step 1140. The SOAP client engine 100 transmits the security processed SOAP message to a server in step 1150.

A SOAP server engine 200 receives the SOAP message from the SOAP client engine 100 in step 2100 and initializes a relevant Web service server 280. When the initialization is performed, for security setting of a request to be received and a response to be transmitted, the Web service server 280 selects required security objects via a security interface 240 and inserts the respective security objects into a request queue 520 and the response queue 540 of the security context object 500 in processing order. Here, security parameters with respect to the security objects are set together. As a result, the security context object 500 for security processing in the server is generated in step 2110.

The security context object 500 generated in step 2110 is transmitted to a security handler 220, which is the SOAP message handler installed in the server, in step 2120. Though a method of transmitting the security context object 500 to the security handler 220 is different according to a SOAP implementation product, in common, the security context object 500 is transmitted to the security handler 220 via a tie object 270. In this case, since the application program is set so that the security handler 220 is called in response to the request message, the SOAP server engine 200 calls the security handler 220 and transmits the SOAP message to the security handler 220 in step 2130. In steps 2110 through 2130, a time when the Web service server 280 is initialized and a method of transmitting parameters to the security handler 220 can be slightly different a little according to a SOAP implementation product.

The security handler 220 calls unit security objects included in the request queue 520 of the security context object 500 received in step 2120 one by one and performs security processing (for example, decrypting and signature verifying) of the received SOAP message in step 2140. The security handler 220 transforms the SOAP message processed in step 2140 into a call of a remote procedure so that the remote procedure provided by the Web service server 280 is performed in step 2150.

Figure 5:
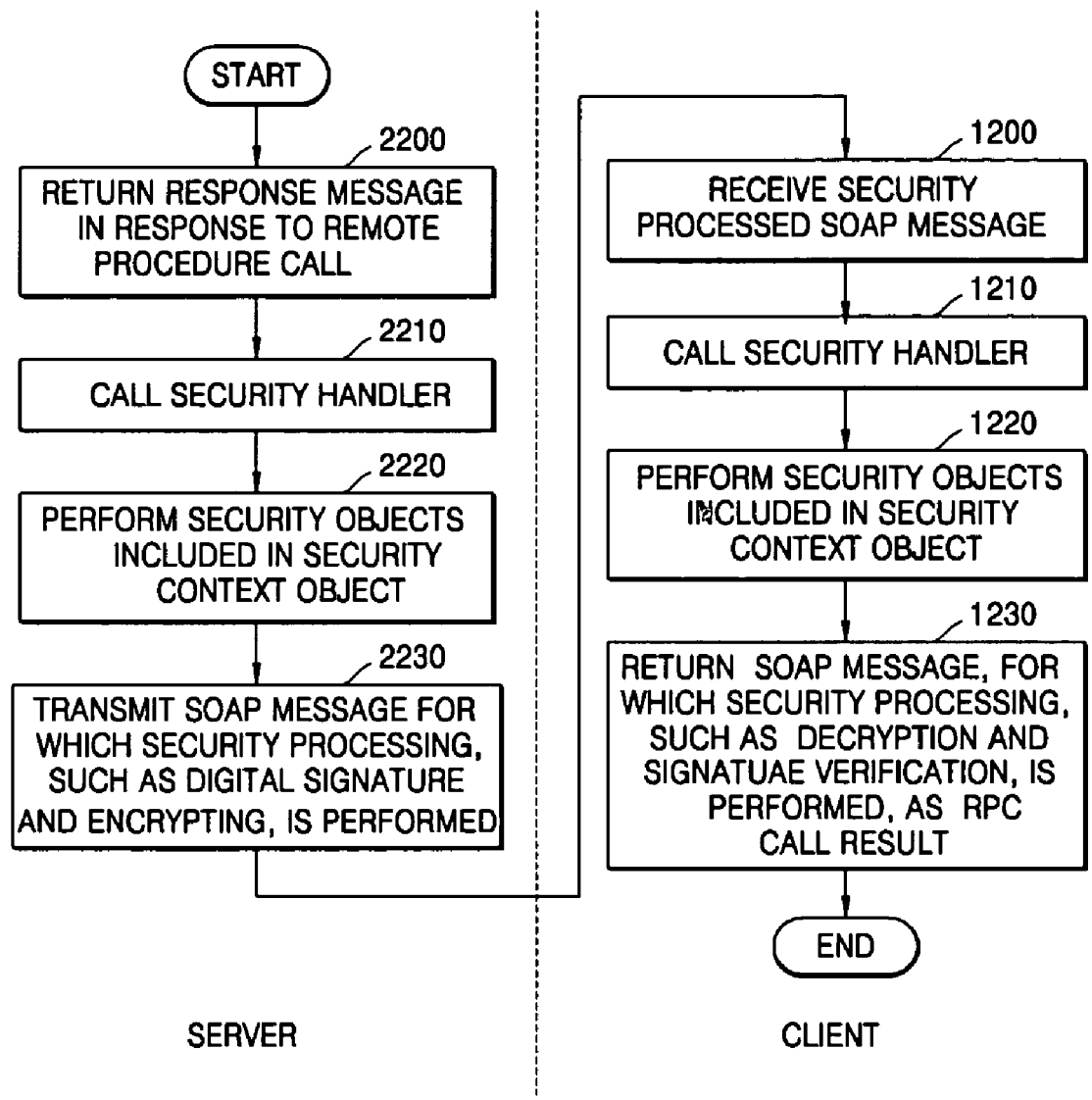
FIG. 5 is a flowchart illustrating an operation of processing security of a response message in the security processing system of FIG. 1.

FIG. 5 is a flowchart illustrating an operation of processing security of a response message in the security processing system of FIG. 1.

Referring to FIGS. 4 and 5, a Web service server 280 returns a response message of a remote procedure call performed in step 2150 of FIG. 4, and the response message is transmitted to a SOAP server engine 200 via a tie object 270 in step 2200. Here, the response message is transformed into a SOAP message.

In this case, since an application program is set so that a security handler 220 is called in response to the response message, the SOAP server engine 200 calls the security handler 220 and transmits the SOAP message to the security handler 220 in step 2210. The security handler 220 calls unit security objects included in the response queue 540 of the security context object 500 received in step 2120 of FIG. 4 one by one and performs security processing (for example, signing and encrypting) of the received SOAP message in step 2220. The SOAP server engine 200 transmits the security processed SOAP message to a client in step 2230.

A SOAP client engine 100 receives the SOAP message from the SOAP server engine 200 in step 1200. In this case, since the application program is set so that a security handler 120 is called in response to the response message, the SOAP client engine 100 calls the security handler 120 and transmits the SOAP message to the security handler 120 in step 1210.

The security handler 120 calls unit security objects included in the response queue 540 of the security context object 500 received in step 1110 of FIG. 4 one by one and performs security processing (for example, decrypting and signature verifying) of the received SOAP message in step 1220. The SOAP client engine 100 transforms the SOAP message processed in step 1220 into a response of a remote procedure call and returns the response to a Web service client 180 in step 1230.

An operation of processing security of a message in a SOAP messaging will now be described. The operation of processing security of a message in a SOAP messaging is very similar to an operation of processing security of a message in a SOAP RPC. The difference is that security handlers 320 and 420 are made as a general application program and directly called by the application program in the SOAP messaging while security handlers 120 and 220 are installed in SOAP engines 100 and 200 as a SOAP message handler in the SOAP RPC.

Figure 6:
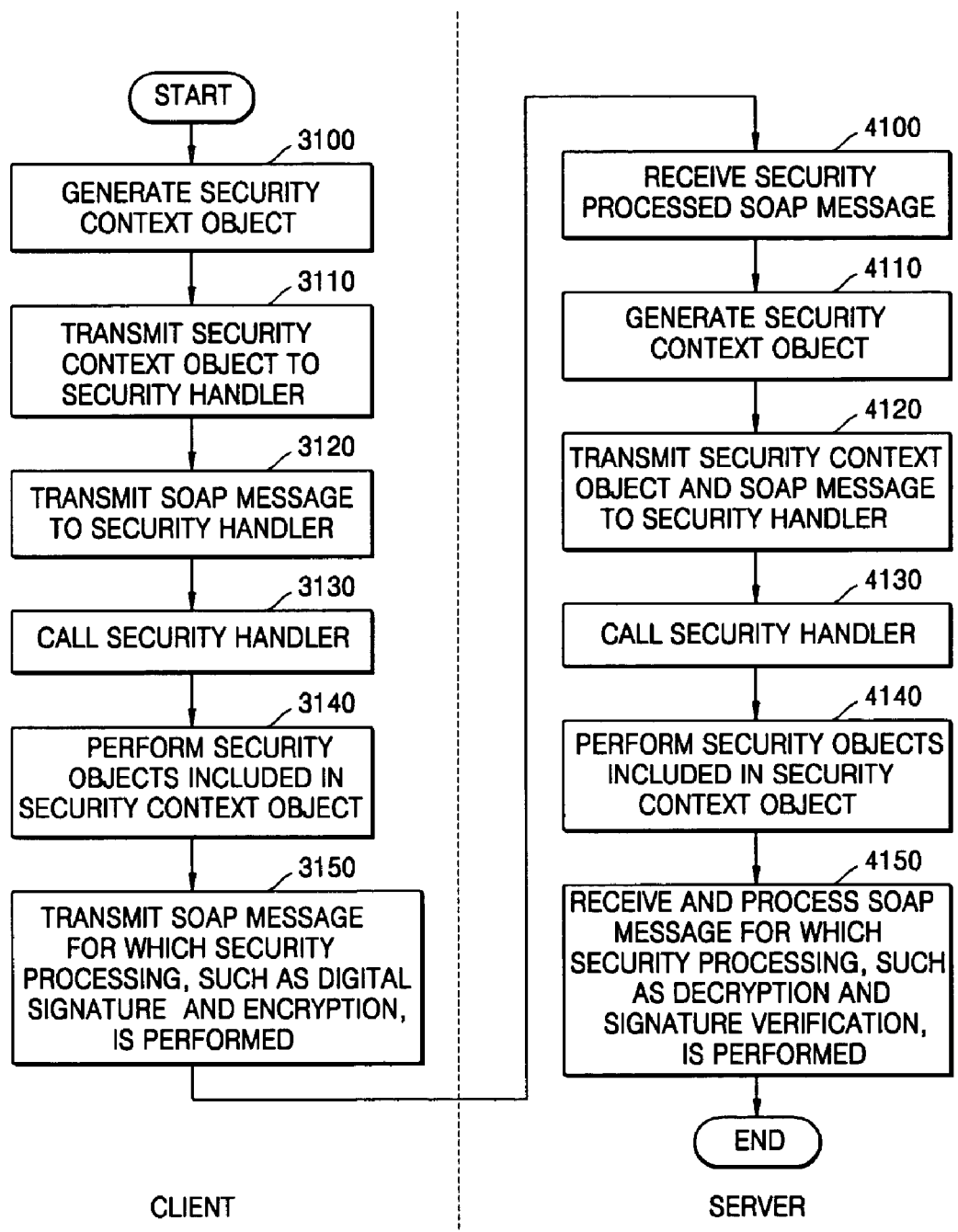
FIG. 6 is a flowchart illustrating an operation of processing security of a request message in the security processing system of FIG. 3.

FIG. 6 is a flowchart illustrating an operation of processing security of a request message in the security processing system of FIG. 3.

Referring to FIGS. 3 and 6, for security setting of a request to be transmitted and a response to be received, a Web service client 380 selects required security objects via a security interface 340 and inserts the respective selected objects into a request queue 520 and a response queue 540 of a security context object 500 in processing order. Here, security parameters with respect to the security objects are set together. As a result, the security context object 500 for security processing in a client is generated in step 3100.

The security context object 500 generated in step 3100 is transmitted as a parameter to a security handler 320 implemented as a general application program in step 3110. The Web service client 380 transmits a SOAP message generated for transmitting to a server to the security handler 320 as a parameter in step 3120 and directly calls the security handler 320 in step 3130.

The security handler 320 calls unit security objects included in the request queue 520 of the security context object 500 received in step 3110 one by one and performs security processing (for example, signing and encrypting) of the received SOAP message in step 3140. The Web service client 380 receives the security processed SOAP message and transmits the security processed SOAP message to a server via a SOAP client engine 300 in step 3150.

A SOAP server engine 400 receives the SOAP message from the SOAP client engine 300 in step 4100 and initializes a relevant Web service server 480. When the initialization is performed, for security setting of a request to be received and a response to be transmitted, the Web service server 480 selects required security objects via a security interface 440 and inserts the respective security objects into the request queue 520 and the response queue 540 of the security context object 500 in processing order. Here, security parameters with respect to the security objects are set together. As a result, the security context object 500 for security processing in the server is generated in step 4110. The security context object 500 generated in step 4110 and the SOAP message generated in step 4100 are transmitted to a security handler 420 implemented as the general application program in the server in step 4120.

The Web service server 480 directly calls the security handler 420 in step 4130, and the security handler 420 calls unit security objects included in the request queue 520 of the security context object 500 received in step 4120 one by one and performs security processing (for example, decrypting and signature verifying) of the received SOAP message in step 4140. The Web service server 480 receives the SOAP message processed in step 4140 and processes the SOAP message in step 4150.

FIG. 7 is a flowchart illustrating an operation of processing security of a response message in the security processing system of FIG. 3.

Referring to FIGS. 6 and 7, a Web service server 480 processes the SOAP message received in step 4150 of FIG. 6 and generates a response message as a SOAP response message in step 4200. The Web service server 480 calls a security handler 420 and transmits the SOAP response message to the security handler 420 in step 4210.

The security handler 420 calls unit security objects included in the response queue 540 of the security context object 500 received in step 4120 of FIG. 6 one by one and performs security processing (for example, signing and encrypting) of the received SOAP response message in step 4220. The Web service server 480 transmits the security processed SOAP response message to a client via a SOAP server engine 400 in step 4230.

A Web service client 380 receives the security processed SOAP response message from the SOAP server engine 400 via a SOAP client engine 300 in step 3200. The Web service client 380 directly calls a security handler 320 and transmits the received SOAP response message to the security handler 320 in step 3210.

The security handler 320 calls unit security objects included in the response queue 540 of the security context object 500 received in step 3110 of FIG. 6 one by one and performs security processing (for example, decrypting and signature verifying) of the received SOAP response message in step 3220. The Web service client 380 returns the SOAP response message processed in step 3220 in step 3230.

As described above, a security processing method of the SOAP RPC and the SOAP messaging according to an embodiment of the present invention can allow new security functions to be applied to the method by adding various security objects to a security context object. Therefore, the method can provide authentication, integrity, confidentiality, and non-repudiation of messages exchanged in Web services to meet requirements of an application program and be applied to various security technologies for SOAP messages besides the Web services security (WS-Security) technology of OASIS when Web service message security technologies are applied to a Web service environment. Also, since a message security processing system and method for Web services according to an embodiment of the present invention use a similar interface for both the SOAP RPC and the SOAP messaging, application program development becomes easy, and setting related to security also becomes easy.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to a message security processing system and method for Web services according to an embodiment of the present invention, when Web service message security technologies are applied to a Web service environment, authentication, integrity, confidentiality, and non-repudiation of messages exchanged in Web services can be provided to meet requirements of an application program.

Also, according to an embodiment of the present invention, since only one common security handler is used for various application programs having different security requirements, message security processing can be performed in the common security handler. Accordingly, application program development becomes easy.

Also, since a security processing method of the SOAP RPC and the SOAP messaging according to an embodiment of the present invention can allow new security functions to be applied to the method by adding various security objects to a security context object, the method can be applied to various security technologies for SOAP messages besides the Web services security (WS-Security) technology of OASIS.

Furthermore, since a message security processing system and method for Web services according to an embodiment of the present invention use a similar interface for both the SOAP RPC and the SOAP messaging, security setting also becomes easy.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A message security processing system for Web services in which messages are exchanged between a client and a server with a SOAP-Remote Procedure Call (RPC) format, each of the client and the server comprising:

a security interface to allow security information related to digital signature, encryption, and timestamp insertion to be set by an application program in a security context object to meet security requirements of the client or the server, a security handler to receive the security context object from the security interface, and to perform security processing of a request message by calling security objects stored in a request queue of the security context object one by one in order and performing security processing of a response message by calling security objects stored in a response queue of the security context object one by one in order; and an XML security unit to support an XML security function called by the security handler, wherein, after the security context object is received by the security handler, the application program performs a SOAP-RPC to exchange the message which is secured by the security handler, between the client and the server, without generating a SOAP message by the application program, wherein the security context object is separate from the messages exchanged between the client and the server using the SOAP-RPC format.

2. The message security processing system of claim 1, wherein the security handler is a SOAP message handler.

3. The message security processing system of claim 1, wherein the application program is installed in a Web service client of the client and a Web service server of the server.

4. The message security processing system of claim 1, wherein the application program; sets security token information, which part of the message is encrypted or signed, and which algorithm is used, required for security, such as digital signatures and encryption, to meet security requirements of the application programs;

designates a combining method of security functions such as whether the digital signature is applied to a message or the encryption is applied to the message and whether the digital signature is performed after the encryption or the encryption is performed after the digital signature; and generates a security context object including the settings.

5. The message security processing system of claim 1, wherein, in the request queue of the security context object, a plurality of unit security objects for security processing of a request message are inserted in an order designated by the application program; and in the response queue of the security context object, a plurality of unit security objects for security processing of a response message are inserted in an order designated by the application program.

6. The message security processing system of claim 5, wherein the request queue and the response queue comprise:

a sign object performing XML Signature and inserting the signature into a SOAP message header;

a verify object verifying the XML signature;

an encrypt object performing XML encryption of the SOAP message and inserting the encrypted message into the SOAP message header or into the SOAP message body;

a decrypt object decrypting the XML encrypted message;

a timestamp insert object inserting a timestamp;

a timestamp check object checking the timestamp; and an additional processing object performing additional processing of the message.

7. The message security processing system of claim 6, wherein the XML security unit comprises:

an XML signature unit called by the sign object or the verify object included in the security context object and performing signing or verifying;

an XML encryption unit called by the encrypt object or the decrypt object and performing XML encryption or XML decryption;

a security token processor processing a security token including the public key information required for the XML signature or the XML encryption;

a crypto library providing algorithms required for the encryption and signature;

an at least one utility executing a utility program required by other XML security units.

8. The message security processing system of claim 5, wherein the request queue and the response queue further comprise:

a decrypt & verify object decrypting an verifying the message in appropriate order by analyzing the order information stored in the message header when a plurality of signatures and encryptions are processed.

9. The message security processing system of claim 5, wherein the application program by itself makes unit security objects required for the application program and inserts the unit security objects into the request queue or the response queue.

10. A security processing method for Web service request messages to be exchanged between a client and a server with a SOAP-Remote Procedure Call (RPC) format, the method comprising:

(a) a Web service client setting a security context object to security information related to digital signature, encryption, and timestamp insertion to meet security requirements for a SOAP RPC request message to be transmitted by the Web service client and a SOAP-RPC response message to be received by the Web service client;

(b) a security handler which is installed as the SOAP message handler and included in the client performing security processing of the SOAP-PRC request message by calling security objects stored in a request queue of the security context object one by one in order;

wherein, after the security context object is received by the security handler, the Web service client performs a SOAP-RPC to exchange the message which is secured by the security handler, between the client and the server, without generating a SOAP message by the Web service client;

(c) a SOAP client engine transmitting the security processing result obtained in step (b) to a SOAP server engine as the SOAP message;

(d) a Web service server initialized by the SOAP server engine and setting the security context object to security requirements for the SOAP-RPC request message received from the client and the SOAP-PRC response message to be returned to the client; and (e) a security handler which is installed as the SOAP message handler and included in the server performing security processing of the received SOAP message by calling security objects stored in the request queue of the security context object set in step (d) one by one in order, wherein the security context object is separate from the Web service response message exchanged between the client and the server using the SOAP-RPC format.

11. A security processing method for Web service response messages to be exchanged between a client and a server with a SOAP-RPC format, the method comprising:
 (a) a Web service server transmitting a SOAP-RPC response message to a security handler included in the server via a SOAP server engine in response to a SOAP-RPC request message initiated by a client application using the SOAP-RPC format to enable the client program, initiating the SOAP-RPC on the Web service, to exchange, during the SOAP-RPC, security information between the client and the server, the web service server to insert the security information into the messages exchanged between the client and the server,
 (b) the security handler included in the server which is installed as the SOAP message handler performing security processing of the SOAP-RPC response message by calling security objects stored in a response queue of a security context object one by one in order;
 (c) a SOAP server engine transmitting the security processing result obtained in step (b) to a SOAP client engine included in the client as a SOAP message;
 (d) the SOAP client engine of the client calling a security handler included in the client and transmitting the received SOAP message to the security handler included in the client; and
 (e) the security handler of the client which is installed as the SOAP message handler performing security processing of the SOAP message by calling security objects stored in the response queue of the security context object one by one in order, wherein the security context object is separate from the Web service response messages exchanged between the client and the server using the SOAP-RPC format.

* * * * *